United States Patent Office 3,072,698
Patented Jan. 8, 1963

3,072,698
QUATERNARY AMMONIUM ALUMINUM HYDRIDES
Alfred A. Hinckley, Beverly, Mass., assignor to Metal Hydrides Incorporated, Beverly, Mass., a corporation of Massachusetts
No Drawing. Filed Jan. 11, 1962, Ser. No. 165,664
8 Claims. (Cl. 260—448)

This invention relates to certain quaternary ammonium aluminum hydrides. This application is a continuation-in-part of my application Serial No. 105,895, filed April 27, 1961.

The United States patent to Mario D. Danus, Thomas R. P. Gibb, Jr. and Robert W. Bragdon No. 2,738,369 describes a method for preparing quaternary ammonium borohydrides. By this method a quaternary ammonium salt or hydroxide is reacted metathetically with an alkali metal borohydride in certain polar solvents to form the quaternary ammonium borohydride and an alkali metal salt or hydroxide. The reaction is illustrated by the equation:

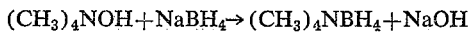

$$(CH_3)_4NOH + NaBH_4 \rightarrow (CH_3)_4NBH_4 + NaOH$$

In the course of my investigations resulting in the present invention, I attempted to prepare lower tetraalkyl ammonium aluminum hydrides by reacting corresponding tetraalkyl ammonium chlorides metathetically with alkali metal aluminum hydrides in a solvent for the latter. Initially, some hydrogen was evolved. After refluxing for 3 hours, followed by agitation overnight at room temperature, the mixture was filtered. The solvent was removed from the filtrate by evaporation to obtain a solid. Analysis of this solid showed it to be essentially the starting alkali metal aluminum hydride. Analysis of the filter residue showed it was not a quaternary ammonium aluminum hydride.

The published literature indicates that quaternary ammonium aluminum hydrides cannot be produced by reacting a quaternary ammonium salt with an alkali metal aluminum hydride in a polar solvent. Thus, the article by Cope, Ciganek, Fleckenstein and Meisinger in the Journal of the American Chemical Society, vol. 82, page 4651, describes the reduction of certain quaternary ammonium salts, such as cyclohexyl and cyclooctyl trimethyl ammonium iodide, with lithium aluminum hydride in tetrahydrofuran, to obtain the tertiary amine in good yield.

The present invention is based upon the unexpected discovery that an alkali metal aluminum hydride, such as lithium aluminum hydride or sodium aluminum hydride, can be caused to react metathetically with certain quaternary ammonium halides, such as the chlorides, iodides, bromides and fluorides, as illustrated by the formula $R_x(CH_3)_yNCl$ where R is a saturated or unsaturated straight chain aliphatic hydrocarbon radical containing from about 7 to about 21 carbon atoms and $x$ and $y$ are integers from 1 to 3 and $x$ plus $y$ equals 4 to form the corresponding quaternary ammonium aluminum hydride and an alkali metal halide. The reaction is illustrated by the equation:

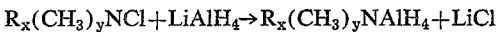

$$R_x(CH_3)_yNCl + LiAlH_4 \rightarrow R_x(CH_3)_yNAlH_4 + LiCl$$

The quaternary ammonium aluminum hydrides thus obtained vary from viscous liquids to waxy solids which are soluble in hydrocarbon solvents, such as benzene, as well as in ethers, such as diethyl ether.

In preparing the quaternary ammonium aluminum hydrides of the invention, the quaternary ammonium halide is mixed with an alkali metal aluminum hydride in a solvent therefor, such as diethyl ether, tetrahydrofuran, etc. Usually, some hydrogen is evolved initially and an equivalent amount of alkali metal aluminum hydride is added. The mixture then is agitated for 2 to 3 hours at room temperature. Preferably, the reaction mixture is refluxed for 2 to 3 hours and then cooled and filtered to remove the precipitated alkali metal halide. The solvent then is removed from the filtrate to isolate the quaternary ammonium aluminum hydride.

In some instances, filtration of the reaction mixture is difficult. In such cases the solvent may be removed from the reaction mixture by evaporation and the residue re-extracted with a hydrocarbon solvent, such as benzene. The solids in the resulting liquor are allowed to settle and the supernatant liquid is decanted. The hydrocarbon solvent is removed from the decanted liquid by evaporation to isolate the quaternary ammonium aluminum hydride.

Illustrative examples of quaternary ammonium halides which may be used in the preparation of the quaternary ammonium aluminum hydrides of the invention are tricapryl methyl ammonium chloride, distearyl dimethyl ammonium chloride, hexadecyl trimethyl ammonium chloride, dipalmityl dimethyl ammonium chloride, tricaprylyl methyl ammonium chloride, trioctadecyl methyl ammonium chloride, trimethyl octadecenyl ammonium chloride, trilauryl methyl ammonium chloride, behenyl trimethyl ammonium chloride, decenoyl trimethyl ammonium chloride, palmitoleyl trimethyl ammonium chloride, and mixtures thereof as well as the corresponding iodides, bromides and fluorides.

The quaternary ammonium aluminum hydrides of the invention are useful as reducing agents and readily reduce ketones and aldehydes to alcohols.

The invention is illustrated further by the following specific examples.

Example 1

In this example the quaternary ammonium halide used was essentially a mixture containing about 55 percent by weight of tricaprylyl methyl ammonium chloride and about 45 percent by weight of tricapryl methyl ammonium chloride.

0.125 mole of solid lithium aluminum hydride were agitated in 200 ml. of diethyl ether in a reaction flask fitted with a reflux condenser, a stirrer and means for introducing the reactants, the condenser being connected to a wet test meter. To this was added 0.125 mole of the quaternary ammonium chloride diluted with 200 ml. of diethyl ether. As the chloride was added 3.26 liters of hydrogen was evolved and this was corrected by adding its equivalent amount of lithium aluminum hydride. The mixture was refluxed for 2 hours, cooled and filtered. The filter residue weighted 5.8 grams and contained 69.1 percent chlorine or 4.8 grams lithium chloride. Based upon the lithium chloride the yield was 90.5 precent. The solvent was removed from the filtrate to obtain 64.5 grams of product which was a viscous liquid containing 0.9 percent hydrogen and 6.8 percent of aluminum by weight.

Example 2

In this example the quaternary ammonium halide used was essentially a mixture containing about 93 percent by weight of distearyl dimethyl ammonium chloride and about 7 precent by weight of dipalmityl dimethyl ammonium chloride.

0.125 mole of solid lithium aluminum hydride and 130 ml. of tetrahydrofuran were agitated in the apparatus used in Example 1. To this was added 0.125 mole (73.3 grams) of the quaternary ammonium chloride dissolved in tetrahydrofuran. The mixture was refluxed for 2½ hours, cooled and filtered. The tetrahydrofuran was removed by evaporation and the residue re-extracted with benzene. After the resulting liquor had settled, the supernatant liquid was decanted and the benzene removed therefrom by evaporation. The resulting product was a soft waxy material weighing 70 grams. The product contained 0.35 percent hydrogen, 5.31 percent aluminum and 2.0 percent nitrogen by weight.

*Example 3*

In this example the quaternary ammonium halide used was essentially a mixture containing about 90 percent by weight of hexadecyl trimethyl ammonium chloride, about 6 percent by weight of octadecyl trimethyl ammonium chloride and about 4 percent by weight of octadecenyl trimethyl ammonium chloride.

0.125 mole of sodium aluminum hydride and 500 ml. of tetrahydrofuran were agitated and heated to reflux in the apparatus used in Example 1. Then 0.125 mole of the quaternary ammonium chloride was added at a regulated rate because the reaction was vigorous and the addition caused foaming. After standing at room temperature for 2 hours the reaction was complete. The reaction mixture was allowed to settle and the supernatant liquid was decanted. The tetrahydrofuran was removed from the decanted liquid by evaporation to obtain 26.5 grams of a waxy solid containing 0.49 percent hydrogen, 7.65 percent aluminum and 3.63 percent nitrogen all by weight.

I claim:
1. A compound responding to the formula

$$R_x(CH_3)_yNAlH_4$$

where $x$ and $y$ are integers from 1 to 3, $x$ plus $y$ equals 4, and R is selected from the group consisting of saturated and unsaturated straight chain aliphatic hydrocarbon radicals containing from about 7 to about 21 carbon atoms.

2. A compound as claimed by claim 1 wherein $x$ is 3.
3. A compound as claimed by claim 1 wherein $x$ is 2.
4. A compound as claimed by claim 1 wherein $x$ is 1.
5. A composition comprising essentially a mixture of compounds each responding to the formula $$R_x(CH_3)_yNAlH_4$$

where $x$ and $y$ are integers from 1 to 3, $x$ plus $y$ equals 4, and R is selected from the group consisting of saturated and unsaturated straight chain aliphatic hydrocarbon radicals containing from about 7 to about 21 carbon atoms.

6. A composition as claimed by claim 5 wherein the predominating compound by weight responds to the formula $R_3CH_3NAlH_4$.

7. A composition as claimed by claim 5 wherein the predominating compound by weight responds to the formula $R_2(CH_3)_2NAlH_4$.

8. A composition as claimed by claim 5 wherein the predominating compound by weight responds to the formula $R(CH_3)_3NAlH_4$.

References Cited in the file of this patent

UNITED STATES PATENTS 2,738,369     Banus et al. _____ Mar. 13, 1956

OTHER REFERENCES

Ruff et al.: Journal of American Chemical Society, vol. 82, No. 9, pp. 2141–2144 (May 5, 1960).